United States Patent
Colsey et al.

(10) Patent No.: US 8,104,066 B2
(45) Date of Patent: *Jan. 24, 2012

(54) USER IDENTIFICATION AND PRIORITIZATION USING BLUETOOTH

(75) Inventors: Nicholas Colsey, Del Mar, CA (US); Thomas Patrick Dawson, Escondido, CA (US); Klaus Hofrichter, San Diego, CA (US); William Schupp, San Diego, CA (US); David Thiele, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 568 days.

This patent is subject to a terminal disclaimer.

(21) Appl. No.: 12/288,821

(22) Filed: Oct. 23, 2008

(65) Prior Publication Data

US 2010/0103316 A1   Apr. 29, 2010

(51) Int. Cl.
*H04N 7/16* (2011.01)

(52) U.S. Cl. ........... 725/141; 725/9; 725/12; 725/25; 725/153

(58) Field of Classification Search ........... 455/433.1, 455/449, 435.1, 517, 456.1, 500, 522, 456; 348/552, 734; 725/9, 12, 141, 153
See application file for complete search history.

(56) References Cited

U.S. PATENT DOCUMENTS

| | | | |
|---|---|---|---|
| 6,874,037 B1 | 3/2005 | Abram et al. | |
| 6,934,540 B2 * | 8/2005 | Twitchell, Jr. | 455/422.1 |
| 7,068,165 B2 | 6/2006 | Takahashi et al. | |
| 7,130,584 B2 | 10/2006 | Hirnoven | |
| 2003/0120750 A1 | 6/2003 | Gaxiola et al. | |
| 2004/0027495 A1 * | 2/2004 | Ferris | 348/734 |
| 2006/0094359 A1 | 5/2006 | Kim | |
| 2006/0172700 A1 | 8/2006 | Wu | |
| 2006/0276211 A1 * | 12/2006 | Gallo | 455/507 |
| 2011/0050999 A1 * | 3/2011 | Doumuki | 348/552 |

FOREIGN PATENT DOCUMENTS

| | | |
|---|---|---|
| EP | 1 771 003 A1 | 9/2005 |
| EP | 1 793 570 A1 | 8/2008 |
| WO | WO 2006/081367 A2 | 8/2006 |
| WO | WO 2008/028574 A2 | 3/2008 |

OTHER PUBLICATIONS

"Cable Eyeing Bluetooth for Home Networks," Ken Freed, Media Visions Journal, Apr. 7, 2003. "Linux Applications for Mobile Bluetooth(TM) Cell Phones: Proximity Tracking with BlueTooth," tuxmobile.org., Date unknown.
"Using Mobile Phones to Spontaneously Authenticate and Interact with Multi-Touch Surfaces," Johannes Schöning, Michael Rohs, and Antonio Krüger, May 2008.

* cited by examiner

*Primary Examiner* — Nay A Maung
*Assistant Examiner* — Cindy Trandai
(74) *Attorney, Agent, or Firm* — Miller Patent Services; Jerry A. Miller

(57) ABSTRACT

In certain implementations, a method of automatically changing an attribute defining operation of a television system involves determining that a plurality of short range radio frequency (RF) transceiver devices have entered RF range of the television system, the television system having a short range RF transceiver compatible with that of the short range RF transceiver device; binding the short range RF transceiver devices to the television set to establish an identity (ID) for the short range RF transceiver devices; determining a priority of each of the plurality of identified short range RF devices; at the television system, looking up a functional attribute associated with the identity having the highest priority; and setting the television parameter according to an attribute associated with a short range RF device having highest priority. This abstract is not to be considered limiting, since other embodiments may deviate from the features described in this abstract.

20 Claims, 6 Drawing Sheets

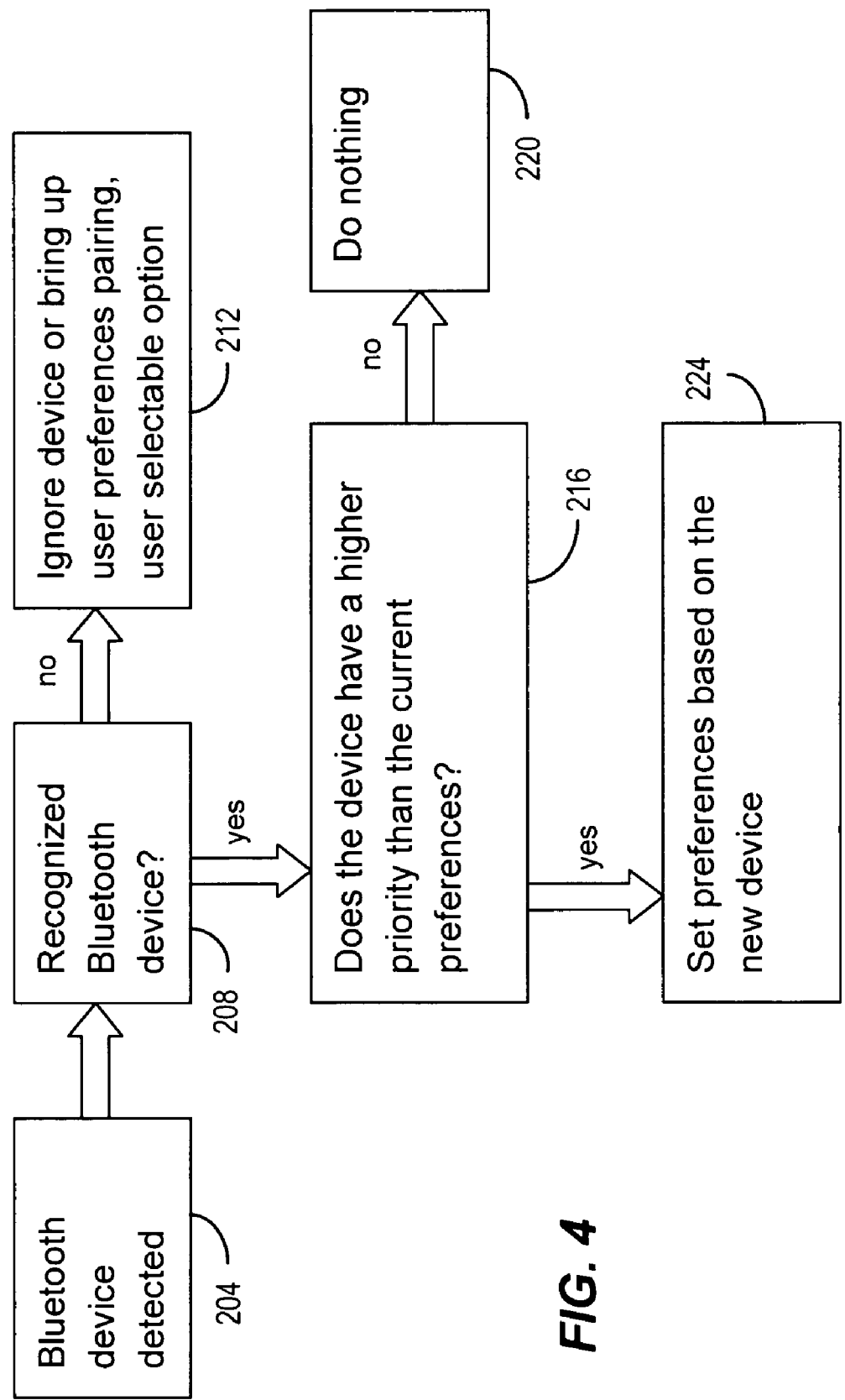

USER IDENTIFICATION AND PRIORITIZATION USING BLUETOOTH

CROSS REFERENCE TO RELATED DOCUMENTS

This application is related to U.S. patent application Ser. No. 12/288,838, now U.S. Pat. No. 7,966,641 filed of even date herewith to Peter Shintani entitled "User Identification Using Bluetooth and Audio Ranging", which is hereby incorporated by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Current preferences and profile systems generally require the user to actively make a selection to change from one set of user preferences to another. Others have tried adding "select preferences" button to the remote. This is just more buttons cluttering up the remote controller and still requires the user to take action for the user preferences to change.

Technology designed to permit parents to control the television content that is being consumed by children has been available for several years now. It is possible to control access to content using several mechanisms, but there is generally no convenient and reliable way to automatically modify control of such access without cumbersome use of password access to parental controls. Most actual implementations associate the control of access with a hardware device that may be used by people with differing needs for content control and therefore have to be modified whenever the needs (i.e., the user) change.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 4 is an example of an operational process consistent with certain embodiments of the present invention.

DETAILED DESCRIPTION

Figure 1:
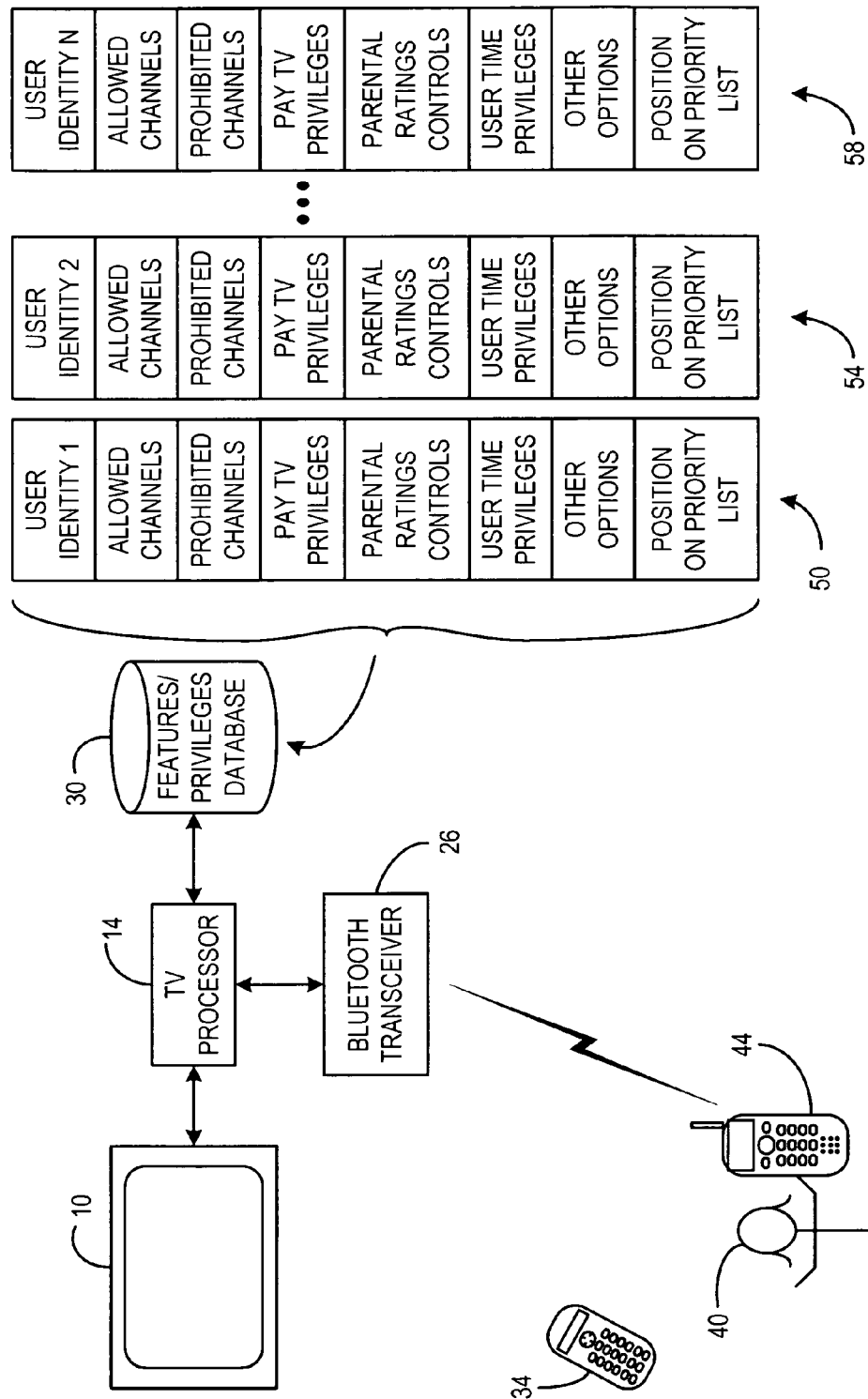
FIG. 1 illustrates an example television system with a single consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

While example embodiments and implementations consistent with the present invention are described herein in connection with a conventional television (TV) receiver, it is possible to locate or parse the functionality described among any consumer electronics device. For example, the functionality described can be implemented in a television set top box (STB) or set back box or other element of a home entertainment system or distributed across several such devices without limitation. Moreover, the database described can be located in an external or an internal storage device without limitation.

Regardless of whether controls or features are established in a TV or STB, the user generally provides a security code in order to activate premium services and/or to set or deactivate parental controls. Hence use of a remote control to enter the pass code is required. As a result, changes are not made as an automatic function, so the user may not immediately understand why something is not active or available (e.g., pay channels) since he may have forgotten that the feature was deactivated because of control changes to suit a prior user (e.g., a child). What is needed is a means to automatically handle changing the user preferences based on the proximity of the user.

A device such as a television system may use a wireless technology such as Bluetooth to indicate the user preferences and settings the device should use. A priority scheme arbitrates when multiple wireless devices are present.

In order to provide added convenience in customization of a consumer device such as a TV set, identification of the user can be utilized to automatically establish features and privileges. In the case of a TV set or other television receiver devices, parental settings, access to premium pay services etc., available channel lineup, etc. can be automatically controlled if the user can be identified. In embodiments consistent with certain example implementations, a television receiver is provided with a Bluetooth short range radio frequency (RF) transceiver interface. When a Bluetooth enabled device is in range of the television receiver, the television receiver identifies the user of the Bluetooth enabled device and uses a prioritization system to determine what features and privileges are active.

In the present description, the term "Bluetooth device" is intended to mean a cellular telephone or other portable device associated with a user that is Bluetooth enabled. Technically, the television system is also a Bluetooth device since it is Bluetooth enabled, but for ease of reference, the television system will be referred to as such with the understanding that it is Bluetooth enabled. It should also be noted that while Bluetooth is used as an example because of its widespread availability and low cost, other short range RF communications standards or custom protocols could be substituted throughout without departing from the invention.

In example implementations consistent with this invention, a set of attributes such as preference values for a device such as a television are associated with a Bluetooth or other short range RF enabled device such as a cellular telephone. A separate set of preferences can be associated with each different Bluetooth device bound to the television system. Device settings include the priority order of the blue tooth devices. When multiple Bluetooth devices (cell phones) are present, the device with the higher priority has its preference used by the television.

A device, such as a television system has a wireless technology such as Bluetooth. Upon sensing the Bluetooth signal, a query is made to determine some identifying element of the wireless device that can be mapped to a set of user preferences. The user preferences can include items such as favorite channels, input device naming, application arrangement, UI customization, parental controls and other settings as available.

The user can be given the opportunity to configure and customize the preferences for a device such as a television. A selection in the preferences setting will match the current preferences settings with the currently detected wireless device. Where there are multiple wireless devices present, the user will be prompted to select one.

If one or more wireless devices have been assigned a set of preferences, the user will then select the relative priority of the new device among the ones already registered. Arbitration can be kept simple by not allowing two devices to have the same priority level. Wireless device priorities for the purposes of preference settings can be kept in a linear list. When a new device arrives it will either have a higher priority on the list or a lower one. If the device has a higher priority the preferences for that association will take effect.

The mechanism may be used to optionally transfer a telephone call to or from a television to a Bluetooth enabled telephone. The television would have telephone, VOIP, Skype or other communications capability. These features can be offered as an add-on to a television or can be built into the television system product.

In accord with certain implementations, a TV system that has Blue tooth capability or a TV that is connected to a device such as an Internet Video Link that provides Bluetooth device detection. Some detected Bluetooth device will influence the preferences setting for the TV if that device has a higher preferences priority than other detected devices. The preferences remain until the user changes the preferences manually or another device with higher preferences priority is detected. The user pairs the device to the preferences by setting the TV to the desired preferences and then pairing a Bluetooth device to those preferences.

In many homes, there are multiple users who also have cell phones or other Bluetooth enabled devices (e.g., personal digital assistants—PDAs, personal computers or other devices) with Bluetooth capability. In order for Bluetooth devices to interoperate, they are bound (associated) with the complementary device(s). Hence all Bluetooth capable devices can be uniquely identified. The TV can be equipped with a Bluetooth interface (I/F), and can identify bound Bluetooth devices within range. The assumption is that each cell phone (or other Bluetooth enabled device) belongs to one member of the household, and the TV could assume that a particular user is associated with each cell phone. In the event that there are multiple phones in the vicinity, a prioritization arrangement is used for each cell phone user, with such priority assigned during setup. User identification via the presence of the user's phone eliminates the necessity for the users to manually identify themselves to the TV and use a pass code in order to access features such as parental control features that can be associated with the user. Other devices in the home can also use the unique ID of each Bluetooth enabled phone for identification.

Bluetooth has a range of about ten meters under normal circumstances, but inside a home there is great variability in this distance. Thus, presence of a Bluetooth enabled device in range of a Bluetooth enabled television receiver provides a good indication that the owner of the Bluetooth device (e.g. cell phone) is a good, but not infallible way to determine if a user is available to control a television receiver's features and privileges including parental control. However, there are many circumstances where the mere presence of a Bluetooth device within range of a television receiver may not be an adequate indication that the associated user is in control of the television's operation (e.g., for purposes of assuring that the content is appropriate to all viewers in the room). For example, a Bluetooth device with high privileges may be in a room upstairs, downstairs or adjacent the room containing the television and remain in range, without the user associated with the Bluetooth device actually being in control and supervising use of the television system.

Consider first the illustration of FIG. 1. In this illustration, a television system has a display 10 that operates under control of a TV processor 14 to provide a picture and further has a TV audio circuit (not shown) that produces audio to one or more speakers or to an external audio system, all of which may operate under control of, or communicate with TV processor 14. In accord with certain implementations consistent with the present invention, the TV system further incorporates a Bluetooth transceiver 26, or is adapted to utilize an add-on Bluetooth module. The various control features and privileges are programmed into the television receiver's TV processor 14 and are stored in memory in an internal or external database 30. In accord with certain embodiments, a default set of features may be enabled in the event no clear controlling entity can be established, or upon power up of the television system (i.e., having highest restrictions—no pay TV, only G rated content, limited channels, etc.). The basic control of the system can be carried out using remote controller 34 in a more or less conventional manner, and the remote controller 34 can be used to override controls that are automatically engaged according to the embodiments disclosed using pass codes if desired.

When no entity having a Bluetooth enabled and recognized device is present, a default set of controls, features and privileges are in place. It is preferred that such default be user programmable, or be established to be appropriate for the viewer requiring the most protection from undesirable content (i.e., the youngest child that might operate or use the system).

Now consider if user 40 enters the room or otherwise comes within Bluetooth range carrying a Bluetooth enabled device 44 such as a cellular telephone. If one assumes that user 40 is an older teenager, perhaps the default controls, features and privileges are unnecessarily restrictive, as decided by the parent. In this case, the user 40's proximity to the television as established when the user is within Bluetooth RF range by the binding of the Bluetooth device 44 with the television system. The Bluetooth transceiver automatically identifies the user 40 as one of the registered users 50, 54 through 58 having a number of attributes such as an identity, a set of allowed channels and/or prohibited channels, pay TV privileges, parental controls, viewing time privileges and other options along with a priority that determines whether user 40's privileges supersede the current privileges or those of other users. The information associated with each user can be stored in database 30, which is expanded in this illustration for clarity.

Figure 2:
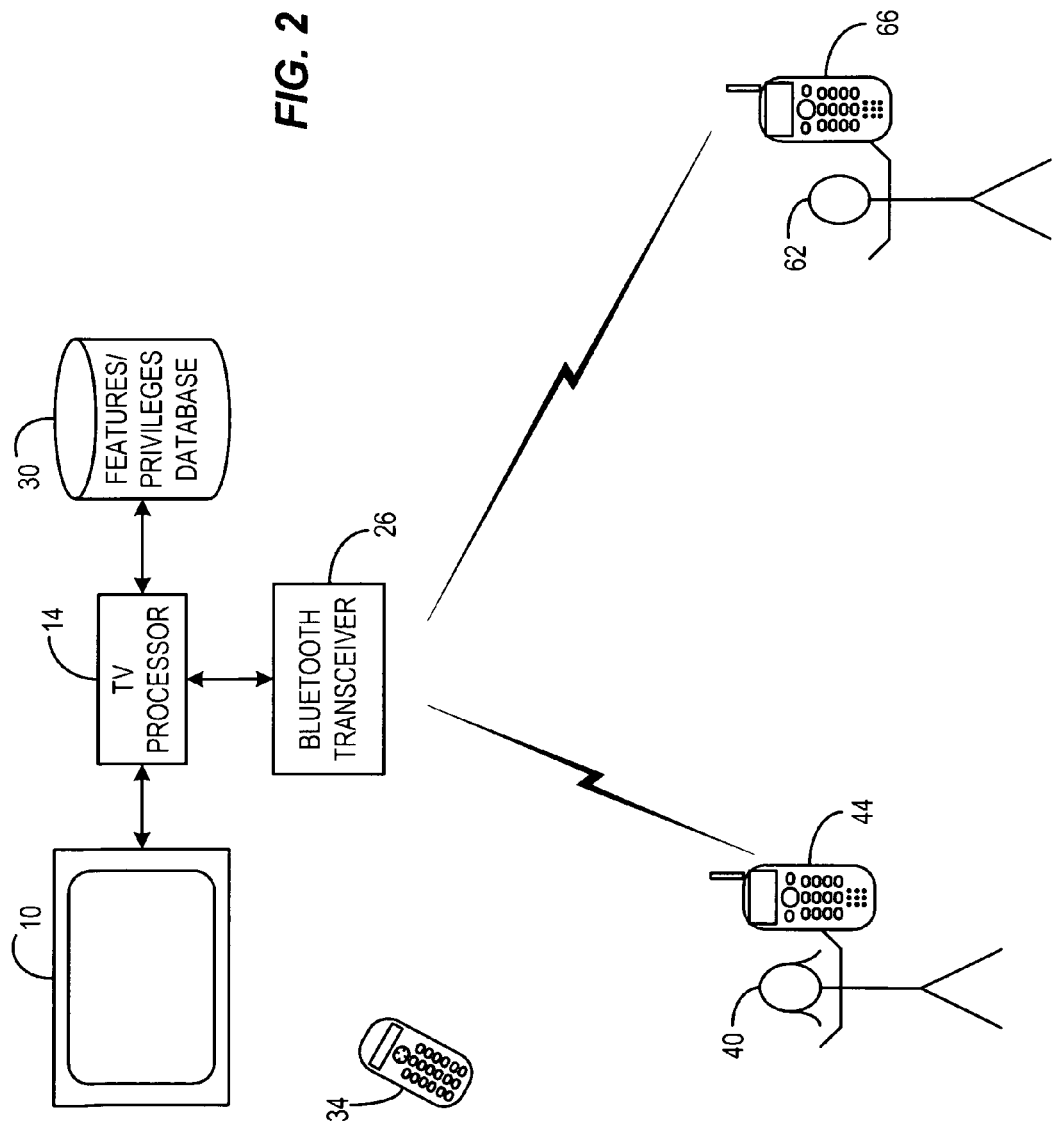
FIG. 2 illustrates an example television system with multiple users consistent with certain embodiments of the present invention.

In FIG. 2, the details of an example database are omitted, but a second user 62 is shown with a second Bluetooth enabled device such as a cellular telephone. For purpose of this description, we can first assume that user 62 has greater priority by virtue of association with Bluetooth device 66 than user 40. If they are both in range of the Bluetooth transceiver 26, then the controls and features associated with user 66 are set by the television system.

Hence, in order for a user to have control of the controls, preferences and settings of the television system, the user 1) is in Bluetooth range, and 2) has the highest priority of the users meeting criterion 1).

If user 40 has priority and user 62 (with higher priority) enters the room, the television system reverts to the priority user (62) and relies either upon the user 62 to change programming or permit the continued viewing of the current content. In the event user 62 leaves the room, the current content can either continue to play until the end or if the current content is outside user 40's privileges, can be halted, paused or stopped. These actions can be defined by the manufacturer or be user selectable at setup.

Thus, as described, if the parent's phone or other higher priority phone is out of range, then the TV's personality is adjusted to that of the other phone which is within range or to a default personality. While Bluetooth is used as an example, the same principles can be implemented using other short range wireless communications technologies including, but not limited to WiFi (802.11g), ZigBee, TransferJet (wireless USB) and other wireless solutions.

Figure 3A:
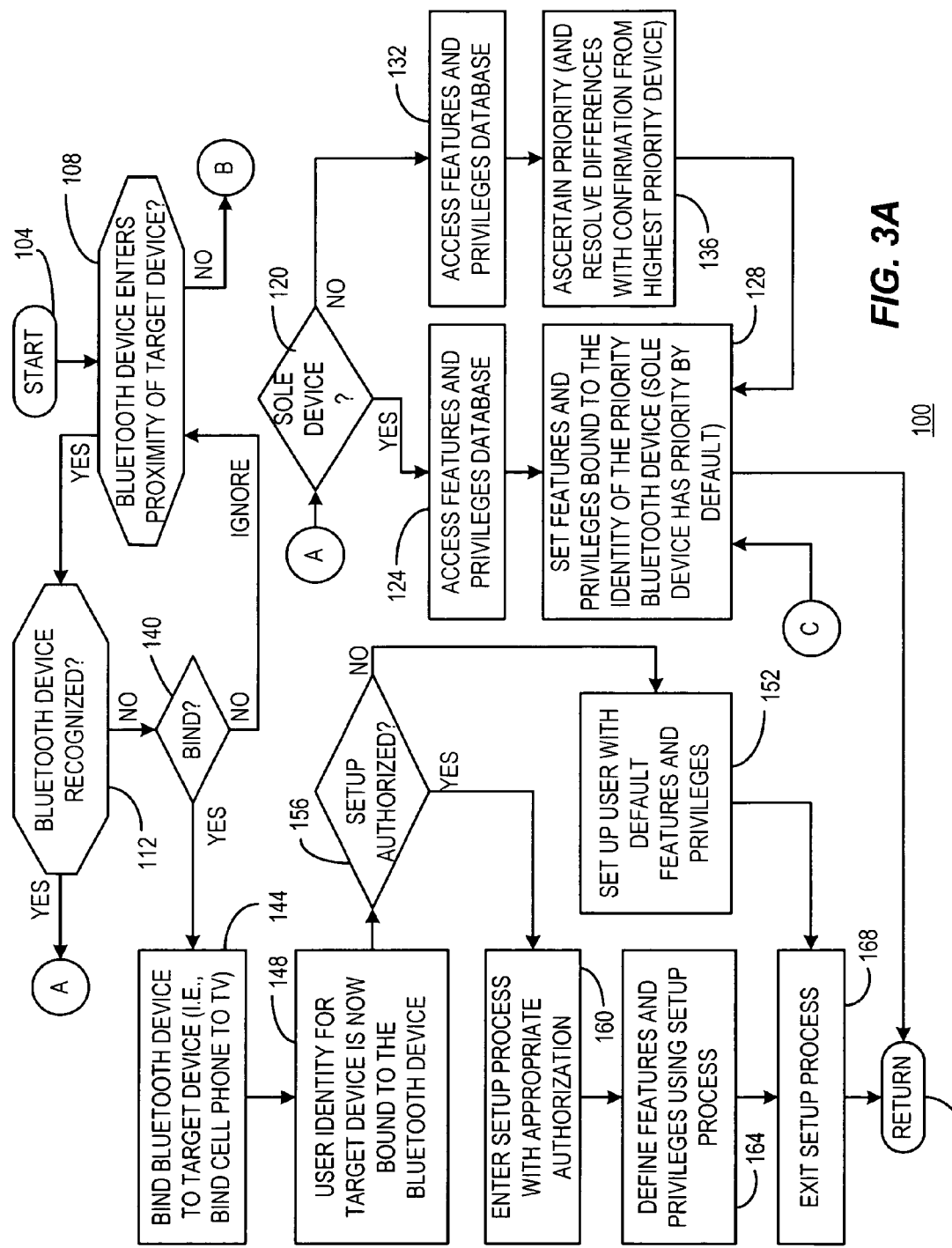
FIG. 3, which is made up of FIGS. 3A and 3B, is an example flow chart of operation consistent with certain implementations of the present invention.
Figure 3B:
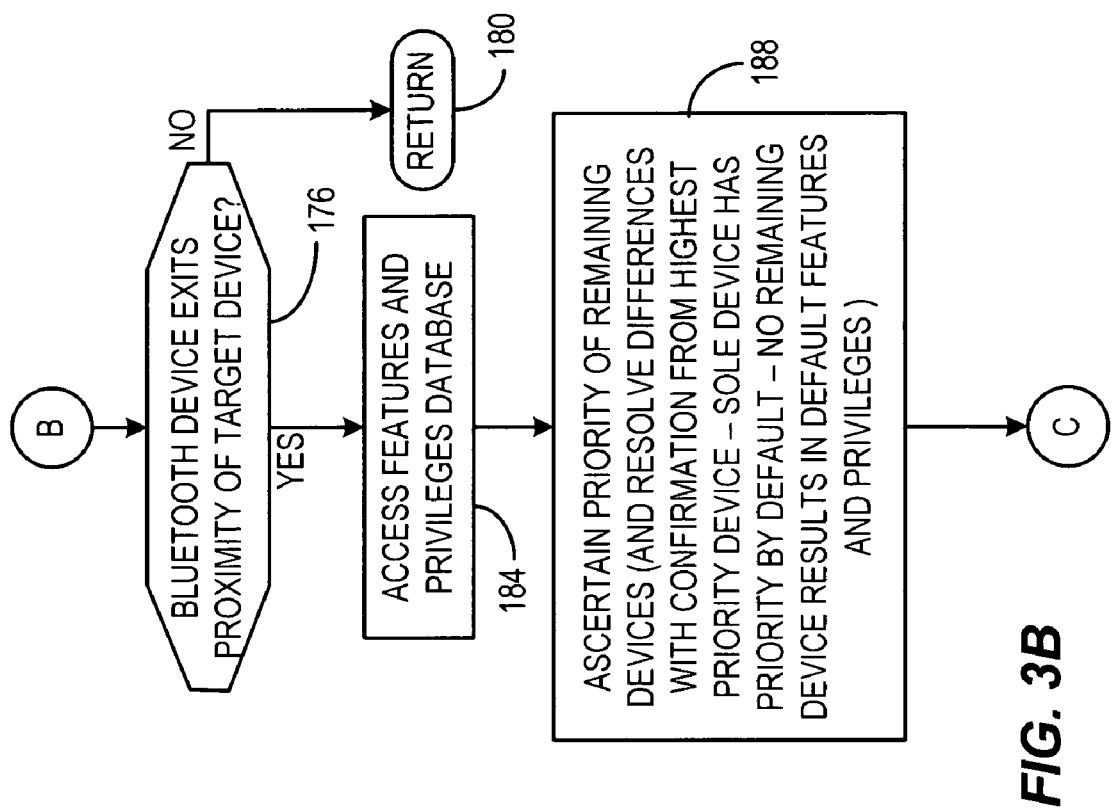

The actions described above can be carried out using TV processor 14 (which may in fact be implemented as multiple processors or hardware equivalents) operating under program control. FIG. 3 made up of FIGS. 3A and 3B depict one example method 100 of operation of the system as described above starting at 104. If a Bluetooth device enters proximity of the target device (e.g., the television system, STB, television, etc.) at 108, and the Bluetooth device is recognized at 112 a determination is made as to whether the Bluetooth device is the sole device present at 120, then the device is identified and its associated features and privileges are accessed in the database 30 at 124. Since it is the sole Bluetooth device, it has priority by default and hence the privileges associated with that identity are established for the television system at 128.

However, if another device is present and thus the device is not the sole device at 120, that features and privileges database is accessed at 132 to determine the priority of the Bluetooth device at 136. The set of features associated with the identity of the highest priority device present are then set at 128. The priority, as discussed above, is dependent on the presence of a Bluetooth device within RF range and the priority as determined from the database.

If a Bluetooth device enters Bluetooth range but is not recognized at 112, the device may be associated (bound) with the television system provided such binding is approved. Approval can be via entry of an approval code using the remote controller 34, or by other suitable action taken by an entity having high enough priority. If no binding is to occur at 140, the presence of the Bluetooth device is ignored unless an entity with high enough priority intervenes at a later time to bind the Bluetooth device.

If the Bluetooth device is to be bound at 140 with the television system, a binding procedure is initiated in which a set of predefined user actions using the remote controller or other actions are implemented to associate the Bluetooth device with a new identity at 144. This can be as simple has having the Bluetooth device within range and having a user with high enough priority enter a setup screen and answer a series of questions to identify the user after which the user is bound to the television system at 148.

In one example implementation, a relatively low priority can bind a Bluetooth device, but the device's privileges and features are set at a default value at 152 unless the setup is authorized at 156 by an entity with high enough priority. If any setup other than the default (which may be high priority user configured) is desired, a setup process is entered at 160 where features, controls and privileges for the new Bluetooth device can be defined at 164 prior to exiting the setup process at 168. The process returns to the start at 172 to await entry or departure of a new Bluetooth device.

If a Bluetooth device is present, but none is currently entering range, the system checks to see if a Bluetooth device is exiting range at 176. In this manner, the system continually looks for entry or exit of Bluetooth devices, with entry and exit for purposes of assuming control being defined by Bluetooth RF range in a loop as indicated by the return to the start at 180. If a Bluetooth device exits proximity at 176, the features and privileges database is accessed at 184 and a determination is made at 188 as to which remaining (if any) Bluetooth device has priority. That device with highest priority is then given control at 128. If all devices have exited, then the default privileges and features are set at 128.

Another example process consistent with certain embodiments is depicted in FIG. 4 wherein when a Bluetooth device is detected at 204, a determination is made at 208 as to whether or not the Bluetooth device is recognized. If not, at 212, the device is either ignored or a process is retrieved to provide for establishing pairing of the device and providing user selectable options. If the Bluetooth device is recognized at 208, a determination is made as to whether or not the device has higher priority than the current preferences at 216. If not, no changes are made as indicated by 220. If so, the new preferences are set based upon the preferences associated with the new device at 224.

Figure 5:
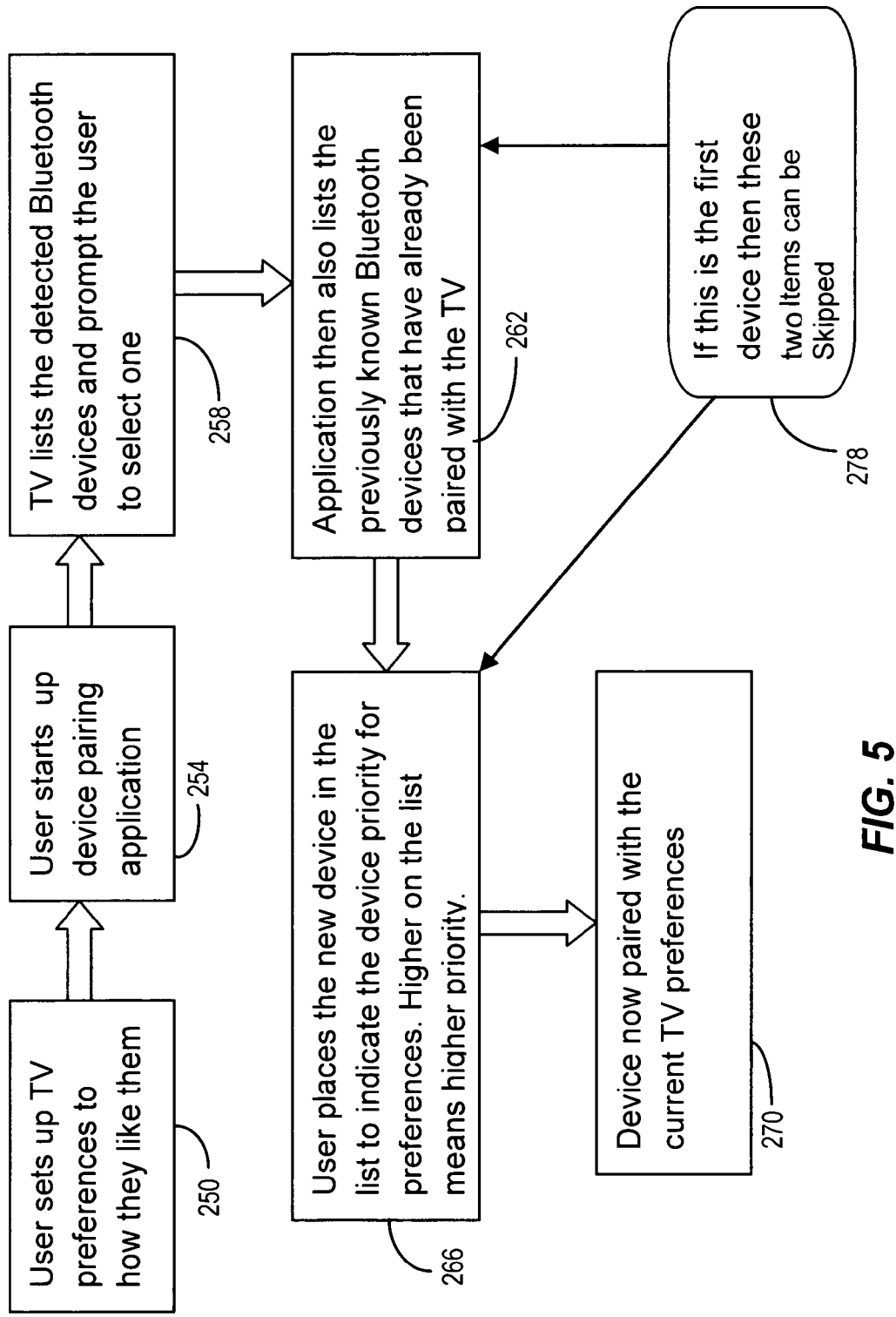
FIG. 5 is an example of an operational process consistent with certain embodiments of the present invention.

Another example process consistent with certain embodiments is depicted in FIG. 5 wherein at 250 the user sets up TV preferences in accord with personal preferences. At 254, the user starts a device pairing application which associates or binds devices to the television system. At 258, the television system displays the detected Bluetooth devices and prompts the user to select one. The application may also lists the previously known Bluetooth devices that have already been paired with the television system at 262. At 266, the user places the new Bluetooth device in the list to indicate the relative priority of the device in relation to the other existing devices with the device hierarchy being indicated by the position on the list. In one example, the higher location on the list indicates higher priority, but other techniques can also be used without departing from embodiments consistent with the present invention. At 270, the device is now paired with the current television system and has associated preferences. As noted at 278, if this is the first device to be paired, items 266 and 262 can be skipped.

Those skilled in the art will appreciate upon consideration of the present teachings that fading of RF signals by virtue of movement within a room or other changing conditions can result in a momentary loss or interference with RF signals and thus a temporary failure of the system to identify all Bluetooth devices that are present. To combat this problem, it may be desirable to implement delays at appropriate points in the process so that priority and control are not constantly shifting. For example, a several second delay can be implemented prior to making a priority change, and a recheck done before a change takes place. Other variations that introduce hysteresis into the decision making process will occur to those skilled in the art upon consideration of the present teachings.

Thus, a method of automatically changing an attribute defining operation of a television system involves determining that a plurality of short range radio frequency (RF) transceiver devices have entered RF range of the television system, the television system having a short range RF transceiver compatible with that of the short range RF transceiver device; binding the short range RF transceiver devices to the television set to establish an identity (ID) for the short range RF transceiver devices; determining a priority of each of the plurality of identified short range RF devices; at the television system, looking up a functional attribute associated with the identity having the highest priority; and setting the television parameter according to an attribute associated with a short range RF device having highest priority.

In certain implementations, a plurality of functional attributes is associated with the highest priority identity, and wherein the plurality of attributes include one or more usage controls and privileges attributes. In certain implementations, the functional attribute comprises a parental control attribute. In certain implementations, the short range RF transceiver comprises a Bluetooth compatible transceiver. In certain implementations, the short range RF transceiver forms a part of a cellular telephone. In certain implementations, the priority of each device is determined by its position on a priority list.

Another method of automatically changing an attribute defining operation of a television system involves determining that a plurality of Bluetooth compatible devices are within Bluetooth radio frequency (RF) range of the television system and that the plurality of Bluetooth devices are also within the predefined distance; binding the Bluetooth compatible cellular telephone to the television set to establish an identity (ID) for the cellular telephone; determining a priority of each of the plurality of Bluetooth devices; and at the television system, looking up a plurality of functional attribute associated with the identity having the highest priority, wherein the plurality of attributes include one or more usage controls and privileges attributes; setting a plurality of television parameters at the television using the functional attributes while the cellular telephone is within Bluetooth RF range.

In certain implementations, the functional attributes comprise parental control attributes. In certain implementations, the priority of each device is determined by its position on a priority list.

A tangible computer readable electronic storage medium storing instructions executed on one or more programmed processors can carry out any of the methods described above.

A television system consistent with certain implementations has a short range radio frequency (RF) transceiver device forming a part of the television system. A programmed processor determines that a plurality of short range RF devices is within RF range of the television system and that the plurality of short range RF devices is also within the predefined distance. The processor binds the short range RF transceiver device to the television set to establish an identity (ID) for the short range RF transceiver device. The processor determines a priority of each of the plurality of short range RF devices. The processor looks up a functional attribute associated with the identity and sets the television parameter according to the functional attribute associated with the short range RF device having highest priority.

In certain implementations, a plurality of functional attributes is associated with the identity having the highest priority, and the plurality of attributes include one or more usage controls and privileges attributes. In certain implementations, the functional attribute comprises a parental control attribute. In certain implementations, the short range RF transceiver comprises a Bluetooth compatible transceiver. In certain implementations, the short range RF transceiver forms a part of a cellular telephone.

Those skilled in the art will recognize, upon consideration of the above teachings, that certain of the above exemplary embodiments are based upon use of one or more programmed processors. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

While certain embodiments herein were described in conjunction with specific circuitry that carries out the functions described, other embodiments are contemplated in which the circuit functions are carried out using equivalent executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A method of automatically changing an attribute defining operation of a television system, comprising:
    determining that a plurality of short range radio frequency (RF) transceiver devices have entered RF range of the television system, the television system having a short range RF transceiver compatible with that of the short range RF transceiver device;
    binding the short range RF transceiver devices to the television set to establish an identity (ID) for the short range RF transceiver devices;
    the television system determining by reference to stored data a priority of each of the plurality of identified short range RF devices;
    at the television system, looking up a functional attribute associated with the identity having the highest priority; and
    setting the television parameter according to an attribute associated with a short range RF device having highest priority.

2. The method according to claim 1, wherein a plurality of functional attributes are associated with the highest priority identity, and wherein the plurality of attributes include one or more usage controls and privileges attributes.

3. The method according to claim 1, wherein the functional attribute comprises a parental control attribute.

4. The method according to claim 1, wherein the short range RF transceiver comprises a Bluetooth compatible transceiver.

5. The method according to claim 4, wherein the short range RF transceiver forms a part of a cellular telephone.

6. The method according to claim 1, wherein the priority of each device is determined by its position on a stored priority list.

7. A tangible computer readable electronic storage medium storing instructions which, when executed on one or more programmed processors, carry out a method according to claim 1.

8. The method according to claim 1, where the stored data are stored in a database.

9. The method according to claim 8, where the stored data are entered into the database by a user.

10. A method of automatically changing an attribute defining operation of a television system, comprising:
    determining that a plurality of Bluetooth compatible devices are within Bluetooth radio frequency (RF) range of the television system;
    binding the Bluetooth compatible cellular telephone to the television set to establish an identity (ID) for the cellular telephone;
    the television system determining by reference to stored data a priority of each of the plurality of Bluetooth devices;
    at the television system, looking up a plurality of functional attribute associated with the identity having the highest priority, wherein the plurality of attributes include one or more usage controls and privileges attributes; and
    setting a plurality of television parameters at the television using the functional attributes while the cellular telephone is within Bluetooth RF range.

11. The method according to claim 10, wherein the functional attributes comprise parental control attributes.

12. The method according to claim 10, wherein the priority of each device is determined by its position on a stored priority list.

13. A tangible computer readable electronic storage medium storing instructions which, when executed on one or more programmed processors, carry out a method according to claim 10.

14. The method according to claim 10, where the stored data are stored in a database.

15. A television system, comprising:
    a short range radio frequency (RF) transceiver device forming a part of the television system;
    a programmed processor that determines that a plurality of short range RF devices are within RF range of the television system;
    the processor binding the short range RF transceiver device to the television set to establish an identity (ID) for the short range RF transceiver device;
    the processor determining a priority of each of the plurality of short range RF devices by reference to stored data;
    the processor looking up a functional attribute associated with the identity; and
    the processor setting the television parameter according to the functional attribute associated with the short range RF device having highest priority.

16. The television system according to claim 15, wherein a plurality of functional attributes are associated with the identity having the highest priority, and wherein the plurality of attributes include one or more usage controls and privileges attributes.

17. The television system according to claim 15, wherein the functional attribute comprises a parental control attribute.

18. The television system according to claim 15, wherein the short range RF transceiver comprises a Bluetooth compatible transceiver.

19. The television system according to claim 15, wherein the short range RF transceiver forms a part of a cellular telephone.

20. The television system according to claim 15, where the stored data are stored in a database.

* * * * *